United States Patent
Ujma et al.

(10) Patent No.: US 7,670,537 B2
(45) Date of Patent: Mar. 2, 2010

(54) APPARATUS AND METHODS FOR ACTIVE MOLD DECOMPRESSION AND MELT ACCUMULATION IN A SHOOTING POT RESERVOIR OF AN INJECTION MOLDING MACHINE

(75) Inventors: Andreas Ujma, Merzig (DE); Enrique Juaristi-Tello, Luxembourg (LU)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 330 days.

(21) Appl. No.: 11/936,123

(22) Filed: Nov. 7, 2007

(65) Prior Publication Data
US 2008/0111265 A1 May 15, 2008

(30) Foreign Application Priority Data
Nov. 10, 2006 (LU) .......................... 91284

(51) Int. Cl.
*B29C 45/53* (2006.01)
*B29C 45/54* (2006.01)

(52) U.S. Cl. .............................. 264/328.1; 264/328.19; 425/557; 425/586

(58) Field of Classification Search .............. 264/328.1, 264/328.4, 328.19; 425/557–561, 586
See application file for complete search history.

(56) References Cited

U.S. PATENT DOCUMENTS 6,241,932 B1  6/2001  Choi et al.

2005/0184434 A1 * 8/2005 Akopyan .................. 264/328.1

FOREIGN PATENT DOCUMENTS

| CA | 2265420 C | 9/1999 |
|----|-----------|--------|
| EP | 0538286 B1 | 11/1994 |

* cited by examiner

*Primary Examiner*—Jill L Heitbrink

(57) ABSTRACT

Active decompression to prevent melt drool from a mold (12, 14) or runner system (20) is achieved through the selective coupling and de-coupling of an injection piston (34) to a plunger (38). Following successive injection (FIG. 5a) and hold phases (FIG. 5b) of an injection molding process (FIG. 5), the runner and channel system is partially de-compressed (FIG. 5c) by drawing back together, over a short distance, the plunger (38) and the injection pressure (34) as one unit. The injection piston is then mechanically de-coupled from the plunger (FIG. 5e), with the injection piston (34) withdrawn to essentially its final shot position, but minus a customary packing distance (δ). Plastic melt (100), extruded into a shooting pot (28) positioned in front of the plunger (38), is permitted to push the plunger backwards, but now with minimal work expenditure. When the plunger again contacts (FIG. 5f) the injection piston (34), melt pressure now causes both units to be moved back to reach a final shot size volume. Finally, the injection piston (34) drives the plunger (38) forward to eject melt accumulated within the shooting pot (28).

19 Claims, 5 Drawing Sheets

FIG. 5a Injection
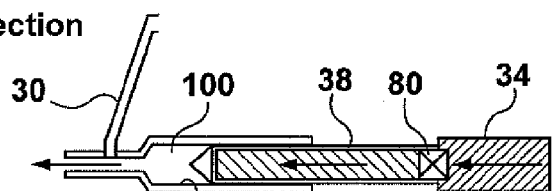
FIG. 5b Hold
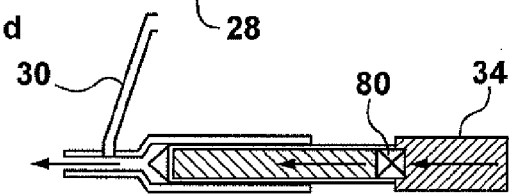
FIG. 5c Decompression
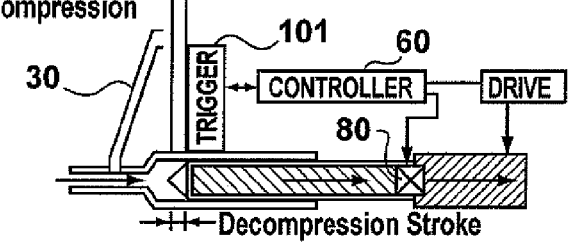
FIG. 5d Dwell time
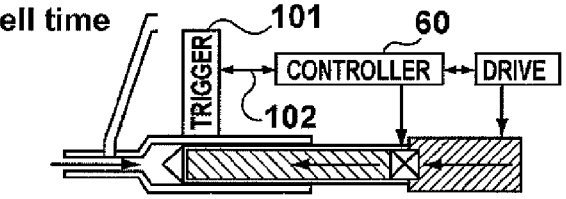
FIG. 5e Transfer of Melt
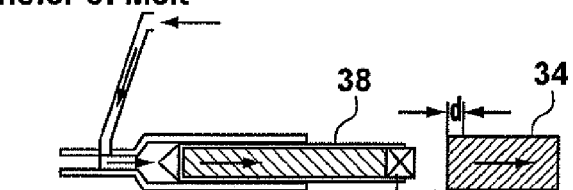
FIG. 5f Attain shot size
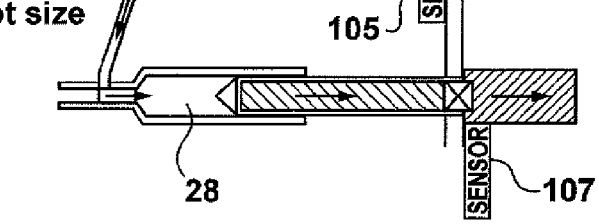

APPARATUS AND METHODS FOR ACTIVE MOLD DECOMPRESSION AND MELT ACCUMULATION IN A SHOOTING POT RESERVOIR OF AN INJECTION MOLDING MACHINE

FIELD OF THE INVENTION

This invention relates, in general, to the operation and configuration of a two-stage injection molding machine and is particularly, but not exclusively, applicable to a melt accumulation stage (involving collaboration between an injection piston and plunger in an injection cylinder) of an in-line compounding machine that operates to produce a shot of plastic melt containing glass fibre (or similar) additives.

SUMMARY OF THE PRIOR ART

Injection molding technology supports the production of molded parts of varying sizes, e.g. bottle preforms, car bumpers and component housings. The benefits of injection molding technology include cycle speed, consistently reproducible part quality and cost. Especially in the context of plastic injection molding, parts are relatively light when compared with cast steel or machined metal alternatives.

In relation to large-sized, lightweight molded parts or parts that require high residual strength, injection molding platforms are moving towards technologies such as:
  i) Thixomolding in which molten magnesium is injected under very low pressure, but at very high speed, to form an injection molded metal part. Processing of molten magnesium is somewhat abrasive on the system components, especially the extruder unit, and it is also necessary for the mold to be treated with release agents to facilitate part de-molding; these are two obvious drawbacks.
  ii) Water-Injection Technology (WIT) that operates to produce hollow plastic components. In this technology, shortly after injection and prior to plastic solidification, the molten core of the plastic part is ejected from the part into a collection reservoir using a stream of high pressure water. Depending on part shape, this technology can unfortunately produce non-uniform wall thicknesses in the finished article, since the flow and action of pressurized water cannot be deterministically controlled. Some of the physical bulk of the molded part is thus removed, but this also potentially reduces the inherent physical strength of the molded part.
  iii) Gas-assisted injection technology employs a similar concept to WIT, albeit that the phase of the evacuating component is different.
  iv) In-line compounding (particularly in the sense of two-stage injection units).

Single stage, reciprocating screw (RS) plasticizing units have, in the past, been used to process: i) "pultruded pellets"; and ii) pre-compounded fibres set into a thermoplastic resin pellet. In an RS extruder, the reciprocating screw is drawn or forced backwards along the barrel during the plasticizing cycle to permit melt to be accumulated in front of a tip of the screw. Pultruded pellets contain strands of fibres that are initially about ~10 millimeters (mm) to ~12 mm in length, whereas the pre-compounded fibres are significantly shorter (typically ~1 mm to ~2 mm). The inevitable shearing action of the RS extruder leads to a significant shortening of these fibres to the extent that a finally molded part includes fibres that are typically less than about ~3 mm to 5 mm in length (from the pultruded pellets) and generally less than ~1 mm (for pre-compounded fibres). Additionally, the abrasive nature of these fibres causes barrel wear issues which must be addressed either through regular maintenance of the machine or the provisioning of appropriate barrel liners and/or screw geometries.

In-line compounding is a two-stage technology that generally commences with a spooled line of fibres, typically glass-fibres (or the like), that are drawn into a two-stage extruder unit by the (usual use and) operation of a twin-screw extruder (TSE). Within the barrel, the flights and configuration of the TSE initially operate to cut each line of fibres into short lengths in the range of about 15 mm to 50 mm, with the process of melt passage (in the extruder and the associated channelling to the mold) then further reducing the length of these already shortened fibres through the actions of shear forces. In general, in glass-fibre type compounding, it will be understood that a certain length of the TSE is used to compound the glass-fibre into the polymer matrix, and that the screws include typically two sets of cutting elements, namely one near a feed-throat for the glass-fibre and one close to a tip of the extruder. Pre-chopped fibres could, however, be used to replace the requirements of a spool-fed line. In in-line compounding, the objective is a final average fibre length of at least ~10 mm, although the longer the better.

Twin screw extruder technology is favoured, but not essential, to in-line compounding because it generally and advantageously provides a less harsh treatment of the chopped fibres. Beneficially, the kneading actions of TSEs ensure that the melt is homogenized and that particles (e.g. fibres or other additives) are evenly distributed.

In both the RS and TSE environments, from a perspective of an overall machine configuration and operation of an in-line compounding machine, it will be understood that, following production of a homogenized plastic melt by the extruder (irrespective of whether the process is continuous or discontinuous), plastic melt is injected into a mold that is clamped between a stationary platen and a moving platen. The mold is, in fact, usually accessed via a suitable distribution manifold (such as a hot runner) that is coupled to the injection unit through a series connection of sprue bushing (that interfaces between the distribution manifold) and a tip of a nozzle adaptor that provide a flow passage for a melt collection chamber, e.g. the shooting pot.

More particularly, in a two-stage environment, a barrel head of the TSE is coupled to a distributor valve via a melt transfer channel (in the form of a generally straight pipe between the extruder barrel head and, typically, a two-way valve). More specifically, with a two-way valve configuration, plastic melt (under pressure flow conditions) flows through the transfer channel (from the TSE) into a shooting pot that accumulates a shot of plastic for subsequent injection into the mold during a molding cycle. As homogenized melt is accumulated, a piston of the shooting pot is controllably moved backwards to increase the volume of the shooting pot, thus allowing the shooting pot to store more melt over time. Once a full shot of plastic has been accumulated in the shooting pot, the two-way valve is re-configured to couple the shooting pot to the manifold through the nozzle adaptor that conventionally interfaces to a sprue on the manifold. An injection piston is then forced forward to engage the plunger to eject melt out of the nozzle. Once the injection stroke is completed, the injection piston is withdrawn. The injection piston is therefore not connected to the plunger.

Consequently, the TSE generally operates in a discontinuous mode (where plasticizing operation is periodically restricted) since the TSE is periodically isolated from any form of collection vessel and continuous plasticization would present logistical storage problems for the system, since the screws in a TSE do not reciprocate to create a reservoir downstream of them in the barrel.

In a two-stage system, finally, to effect injection of melt under high pressures into the mold, the machine platens and the mold are clamped together under applied tonnage and then the injection piston is forced forward to empty the shooting pot.

In overview, in a compounding system, to ensure molded part strength, besides having to ensure that the fibres are evenly distributed throughout the plastic melt and hence within the final molded part, it is important that the fibres remain relatively long (since this intrinsically provides bonding strength). Equally, it is desirable that there is a narrow glass fibre length distribution from an average fibre length; this provides uniformity in the bulk properties of the molded part.

In any two-stage system, one of the problems that must be addressed relates to possible drooling of melt at the non-accessible/non-visible interface between the hot and cold regions of the mold. This interface is generally known as the "sprue" and is found at the tip of a nozzle adaptor (which is itself located in front of the shooting pot and plunger assembly). Unfortunately, drooling can result in solidification of the plastic and this can cause both future contamination of an injection shot and/or a complete blockage or a flow restriction within the melt path from the shooting pot to the mold. In relation to any form of flow restriction (whether complete or partial), the system is therefore susceptible to different fill profiles between successful cycles; this is unacceptable. Any change in the flow fill profile can also result in undesirable weld lines occurring at uncontrollable positions within the molded part. These weld lines are reflective of areas on non-homogeneity and, consequently, cause the molded part to experience different, uncontrolled and undesirable mechanical properties at different locations within its structure.

In packaging environments, the plunger and injection unit are permanently coupled together. As melt is fed into the shooting pot, a coordinated, slow backwards movement of the plunger and the injection unit keeps the head of the plunger in close proximity to the melt front, although the melt front often exerts a positive force to also assist in pushing the plunger backwards. This slow, backwards movement may have a limited decompression effect on the hot runner. At a given point, this mechanically-assisted movement is stopped, thereby causing the melt to undertake all the work required to push back completely the piston-plunger assembly and thereby to pack out the shooting pot to eliminate spaces and air pockets within the accumulated melt.

In certain and current PET injection molding systems, the injection piston and plunger are mechanically isolated from one another. Specifically, during shot collection/accumulation, the injection piston is hydraulically withdrawn to the shot volume minus a small packing distance, whereas the injection plunger is singularly driven back to the requisite shot volume minus the small packing distance by the sole action of the melt. In this way, when extruded melt is communicated through the transfer channel (via a two-way valve and into the shooting pot) the melt transfer pressure and therefore melt load is minimized. In other words, the melt does not have to undertake "work" in pushing back the injection piston over the majority of its distance, but it does undertake work in relation to the plunger over the entire distance that the plunger travels. The melt does therefore experience shear and, consequently, fibre length (for in-line compounding applications) can be maintained to some extent during this initial phase of melt accumulations. [As will be understood, shear effects have the results of both reducing fibre length (in-line compounding applications) and affecting general melt properties/quality]. Eventually, melt causes the plunger to contact the injection piston and both are then forced backwards together over a small distance to ensure that the final accumulated shot contains no air/spaces. During this time when there is the final take-up (typically over the last few millimeters of travel of the plunger) significant work is done against: i) hydraulic oil pressures associated with the injection piston; ii) the frictional forces related to movement of the injection piston that is now contacted by the plunger; and iii) the mass of (particularly) the injection piston.

U.S. Pat. No. 6,241,932 describes the conventional separation of the melt preparation and the injection system in which the plunger is not connected to the injection piston. In this patent, after the hold period, the injection piston is pulled back to the requisite shot size and extruded melt pushes the plunger backwards. A sensor is used to measure the instant when the plunger contacts the injection piston. Generally, this configuration is used in a PET (multi-cavity) injection molding environment where valve-gating technology is used to shut off and open up the cavities.

Unfortunately, while valve gating can provide an effective shut off (anti-drool) capability, valve gate technology cannot be applied to an in-line compounding environment where long fibres can potentially become entwined or otherwise wrapped around the valve stem, whereafter operation of the valve stem is restricted or stopped.

For in-line compounding, one apparent solution proposed by the company Krauss-Maffei Kunststofftechnik GmbH of Munich, Germany, is to include a pressure transducer in front of the extruder unit (i.e. in the transfer channel between the extruder and the nozzle adaptor). This system has the plunger permanently coupled to the injection unit. The pressure transducer acts to measure pressure and, based on a pressure signal, actively controls the backwards movement of the combined piston and plunger sub-assembly. Consequently, the signal processing and control is relatively complex and expensive and the melt always experiences some pressure as it abuts against and pushes the plunger (notwithstanding that the plunger's movement is assisted). This configuration therefore sees that melt continues to perform work in moving the combined mass of the plunger and injection piston and also in overcoming fractional and resistive forces associated with these system components and their function. In any event, the location of the transducer in the transfer channel is not ideal and its pressure measurement therefore relates to the extrusion pressure and not the pressure in the shooting pot reservoir. Location of the pressure transducer in the barrel is possible, but not considered particularly viable.

For completeness, it is noted that certain systems already include a pressure transducer downstream of the extruder and typically within the transfer channel between the extruder and the two-way valve 26. Persons skilled in the art will appreciate that the two-way valve 26 is a diagrammatic representation of a two-way value 26 and the representation does not illustrate the internal structure or mechanics of the two-way valve. Personal skilled in the art will also appreciate that the two-way valve operates to permit a transfer of melt from the transfer channel 30 to the shooting pot reservoir 28, or a transfer of melt from the shooting pot reservoir 28 to the hot runner 20. Such pressure transducers, however, generally act as safety devices and are linked to an extruder controller that operates to shut down the extruder whenever excess pressure is measured (for whatever reason). The transducer therefore acts to prevent the bearings in the extruder from being overloaded and thus to restrict the likelihood of potentially expensive damage being done to the extruder.

EP-B-0538286 (Putsch) describes an in-line compounding system that operates in a continuous fashion. Homogenized melt is buffered in a temperature-controlled buffer store before being introduced into an injection plunger unit. EP-B-0538286 further discusses the use of differing types of additives and fibres to produce a variety of plastic parts having different properties and uses.

SUMMARY OF THE INVENTION

According to the invention there is provided a method of active decompression of an injection molding system having a molding environment containing at least one of a mold and a runner system the injection molding system having a combination of an injection plunger and an injection piston arranged to effect injection of melt into the molding environment, the method comprising: temporarily coupling the injection plunger to the injection piston to effect limited decompression of the molding environment, the temporary coupling permitting the injection plunger and injection piston to be pulled back together at a time after the injection of melt; and at a time after the injection plunger and injection piston have been pulled back together, physically separating the injection piston from the injection plunger to permit the injection piston to be pulled away from the injection plunger in an assisted manner.

In another aspect of the present invention there is provided a method of developing volume in a shooting pot reservoir in an injection cylinder containing a moveable plunger and an injection piston, the method comprising: initially connecting together and pulling back the plunger and the injection piston to define a first volume within the shooting pot reservoir; disconnecting the plunger from the injection piston and pulling back the injection piston to a predefined check point; and accumulating melt in the first volume and permitting the plunger to be pushed back by action of the melt, the volume of the shooting pot reservoir thereby increasing as the plunger moves towards the injection piston at the predefined check point.

In a further aspect of the present invention there is provided a two-stage injection unit having: a shooting pot for accumulating, in use, a shot of melt; a plunger axially movable within the shooting pot; an injection piston arranged to initiate, in use, ejection of the shot of melt accumulated in front of the plunger and within the shooting pot; a drive unit, coupled to the injection piston, for both driving the injection piston forward to force, in use, ejection of melt from the shooting pot and for retracting the injection piston backwards; and a coupling permanently attached to one of the plunger and the injection piston, the mechanical coupling selectively connectable to the other of the plunger and the injection piston to permit: i) the plunger and the injection piston to be connected together temporarily during a portion of the melt accumulation process; and ii) the injection piston and the plunger to be retracted together by the drive unit for a first period of time after the ejection of melt from the shooting pot and for the injection piston to be retracted independently of the plunger during a second of period of time that follows the first period of time.

In one embodiment, a first sensor is arranged to generate a first control signal that temporarily suspends retraction of the injection piston at the end of a decompression stroke. The first control signal may also cause the coupling to effect disengagement of the plunger from the injection piston.

In yet another aspect of the present invention there is provided an injection molding machine comprising a two-stage injection unit: a shooting pot for accumulating, in use, a shot of melt; a plunger axially movable within the shooting pot; an injection piston arranged to initiate, in use, ejection of the shot of melt accumulated in front of the plunger and within the shooting pot; a drive unit, coupled to the injection piston, for both driving the injection piston forward to force, in use, ejection of melt from the shooting pot and for retracting the injection piston backwards; and a coupling permanently attached to one of the plunger and the injection piston, the mechanical coupling selectively connectable to the other of the plunger and the injection piston to permit: i) the plunger and the injection piston to be connected together temporarily during a portion of the melt accumulation process; and ii) the injection piston and the plunger to be retracted together by the drive unit for a first period of time after the ejection of melt from the shooting pot and for the injection piston to be retracted independently of the plunger during a second of period of time that follows the first period of time.

In one embodiment, the injection unit molding machine is an in-line compounding machine that uses glass fibres or the like within a polymer matrix.

Advantageously, the present invention provides a simplified de-compression system that reduces the likelihood of drool from a cavity or runner systems while furthermore reducing shear stresses experienced within a melt during accumulation in a shooting pot. The system is operator friendly in that it is easy to set up and requires only knowledge of the final shot size/volume to be injected and hence the end point of travel of the injection piston. Use of a simple position switch or timing calculation may act as a trigger for coupling and decoupling. Beneficially, the present invention does not require detailed signal processing, nor multiple measurements of pressure or plunger location.

BRIEF DESCRIPTION OF THE DRAWINGS

Embodiments of the present invention will be described, by way of example only, with reference to the drawings in which:

FIG. 5 is a schematic representation of various and successive stages of accumulating and injecting melt employed by the injection unit of FIG. 2.

DETAILED DESCRIPTION OF THE PREFERRED EMBODIMENT

Figure 1:
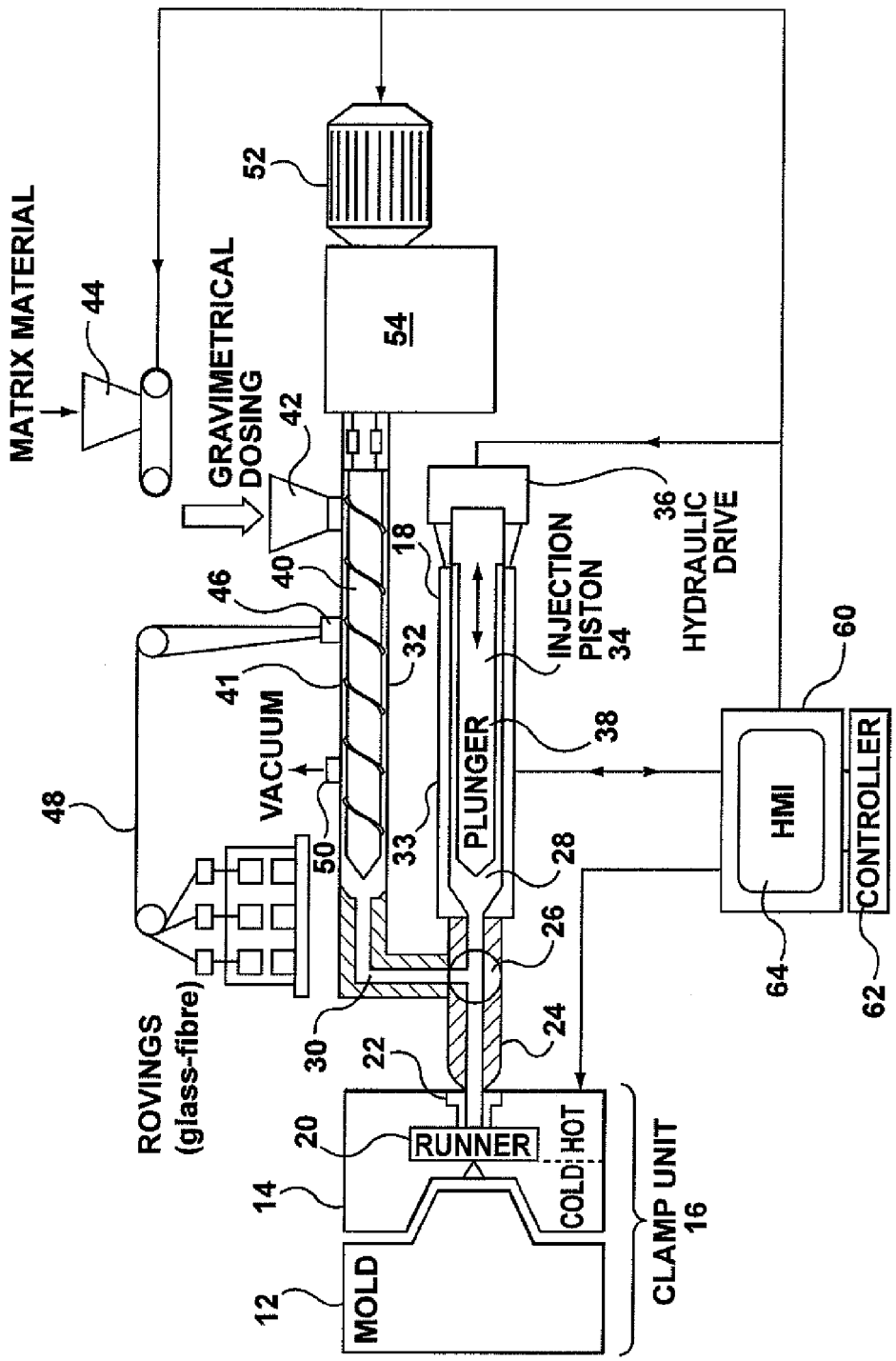
FIG. 1 is a schematic representation of a typical injection molding machine that can be adapted to include the present invention.

FIG. 1 shows a typical injection molding machine 10 (although in this case an in-line compounding machine) that can be adapted to support an active decompression function according to the various embodiments of the present invention. Although represented as a two-platen system, the machine could equally be a three platen machine (for example).

Like conventional machines, during each injection cycle, the molding machine 10 produces a number of plastic parts corresponding to a mold cavity or cavities defined by complementary mold halves 12, 14 located within the machine 10.

The injection-molding machine 10 includes, without specific limitation, a clamp unit 16 as well as an injection unit 18 for plasticizing and injecting material. In operation, the movable platen is moved relative to the fixed platen by means of stroke cylinders or the like. Clamp force is developed in the machine, as will readily be appreciated, through the use of tie bars and a tie-bar clamping mechanism. The clamping mechanism is (generally) fixedly attached to the moving platen (typically through the use of bolts). Once the tie-bar is positively engaged in its respective clamp piston, mold clamp force (i.e. closure tonnage) can be applied through the use of (typically) a hydraulic system that is usually directly associated with the clamp piston.

The mold halves 12, 14 together constitute a mold generally having one or more mold cavities, with the mold halves 12, 14 each located in one of the movable platen and the fixed platen. The mold halves will, as usual, include projections (such as mold cores or leader pin alignment columns) that must be aligned and interconnected accurately to avoid wear and to produce commercially acceptable parts.

In terms of the injection unit 18, this typically interfaces to some form of distributor 20 at the back of a hot half of the mold. The distributor could be a hot runner or a cold runner, for example. A sprue 22 provides an interface between the distributor 20 and a nozzle adaptor 24 that houses a two-way valve 26. The two-way valve 26 permits either: i) the sprue 22 to be in fluid communication with a shooting pot reservoir 28; or ii) a transfer channel 30 (connected to an extruder 32) to be in fluid communication with the shooting pot reservoir 28. The injection unit 18 further includes an injection cylinder 33 that includes an injection piston 34 that is axially movable by (typically) a hydraulic drive 36. The injection cylinder 33 further includes an injection plunger 38 is axially movable within the injection cylinder, with the plunger 38 helping to define the shooting pot reservoir 28 where melt can accumulate.

The extruder 32 contains a plasticizing screw 40 within a barrel 41, the barrel having at least one material entry point, e.g. feed-throat 42, receptive to gravitational dosing of a matrix material, such as plastic pellets from hopper/dryer 44. In the case of an in-line compounding machine, the barrel 41 also includes a rovings entry point 46 into which are fed glass fibres or the like for compounding requirements. As appropriate, the barrel 41 may also include a vacuum port 50.

The plasticizing screw 40 is driven by a suitable motor 52 coupled through a gearbox 54.

Operational control of the system is conventionally performed via a machine controller 60 that it includes a human-machine interface (HMI) 64 permitting entry and display of data. Amongst other operations, the machine controller 62 controls the operation of the clamp unit 16, the injection unit 18 (including the injection piston 34 and plunger 38) and the extruder 32. These operations may be triggered, controlled or regulated by control signals generated by suitably located sensors within the system. Closed loop control architecture is sometimes used.

Figure 2:
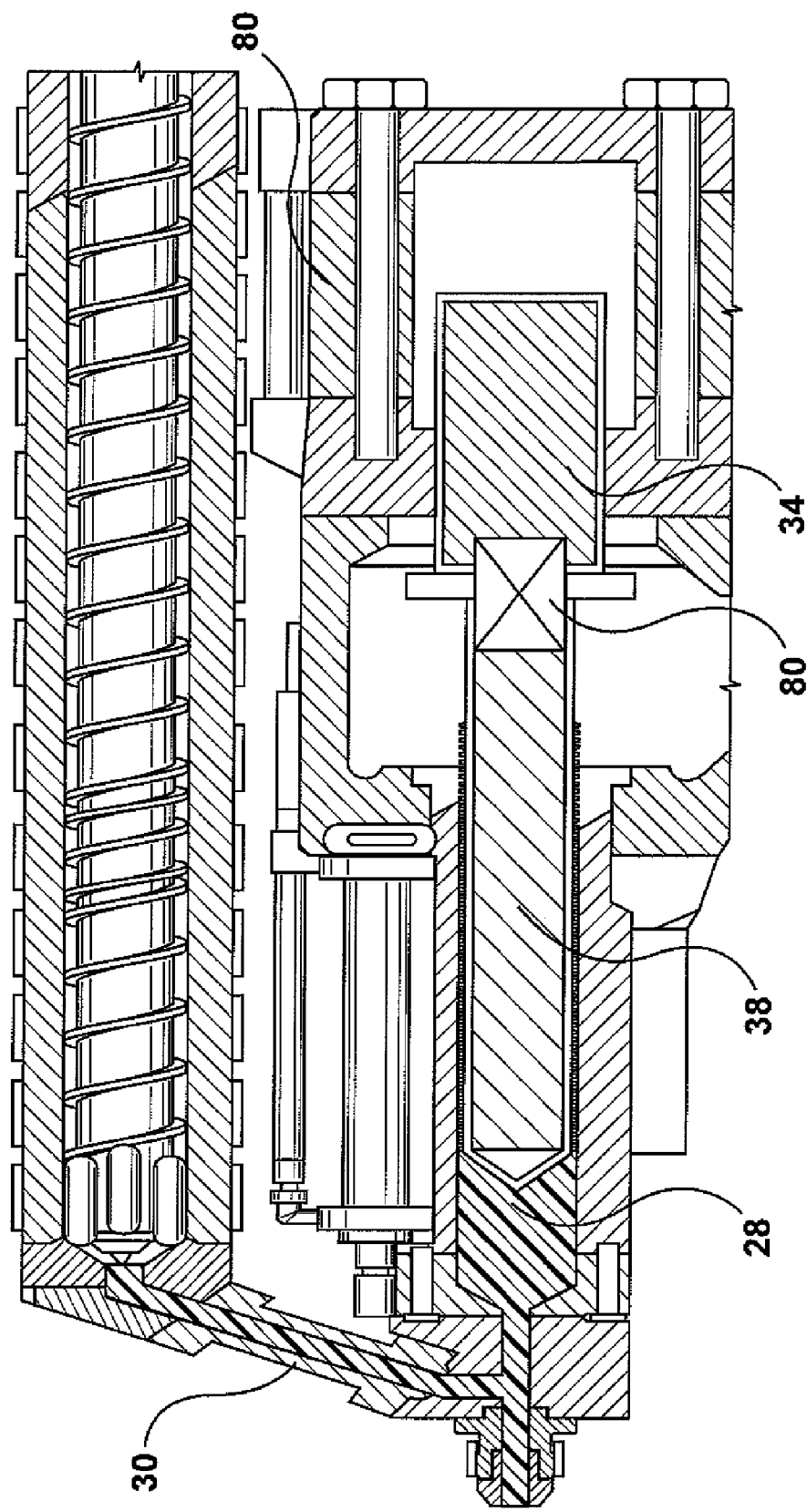
FIG. 2 is a sectional view through an injection unit of a preferred embodiment of the present invention.

Referring briefly to FIG. 2, a section view through an injection unit of a preferred embodiment of the present invention is shown. In addition to the basic component configuration of FIG. 1, FIG. 2 includes a connector (i.e. a coupling) 80 that is preferably, but not necessarily, located between an end of the plunger 38 (remote from the barrel head/two-way valve 26) and the injection piston 34. The connector 80 permits selective coupling of the plunger 38 to the injection piston 34. The exact position and location of this connector is not important, although it must be permanently coupled to at least one of the plunger 38 or the injection piston 34. The exact point of fixing is also not important, but presently the end of one of these units is easily accessible and therefore the most logical and practical choice.

Figure 3:
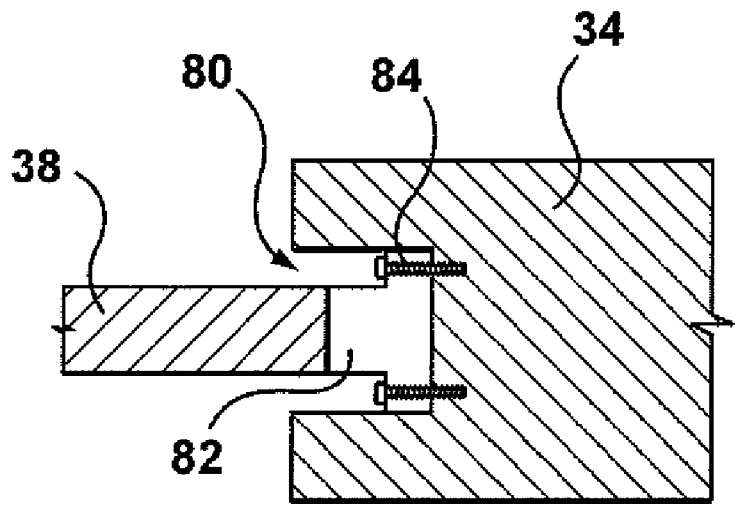
FIG. 3 is a preferred embodiment of a selectively operational connection between a plunger and an injection piston of FIG. 2.
Figure 4:
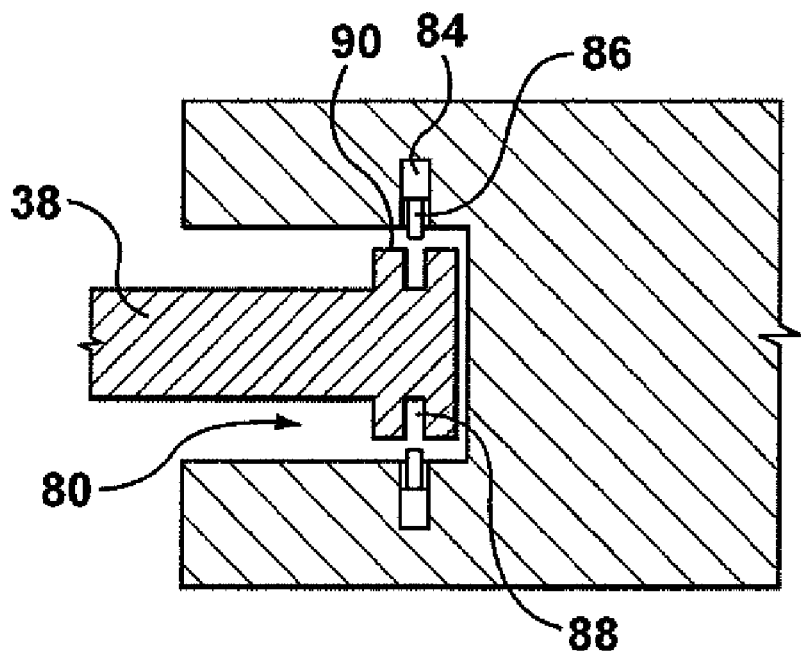
FIG. 4 is an alternative embodiment of a selectively operational connection between a plunger and an injection piston of FIG. 2.

Referring to FIGS. 3 and 4, two alternative embodiments for the connector 80 are shown.

In a first embodiment (FIG. 3), the connector is realised by an electromagnet 82 that is permanently coupled (e.g. through the use of bolts 84) to the end of the injection piston 34. Provided that the plunger 38 is made of a magnetic material (usually steel), selective energization of the electromagnet 82 permits the injection piston 34 to be coupled to the plunger 38. Control of the electromagnet 82 is rested with the machine controller 60. For the sake of simplicity and clarity, the various electrical connections to the electromagnet have been omitted, especially since the wiring of such a circuit is well known and understood by the skilled addressee. Optionally, the electromagnet may be recessed into one of the injection piston 34 or the plunger 38, with accurate recessing providing stability for the electromagnet's overall installation.

In the alternative (FIG. 4), rather than in using an electromagnet 82, an alternative embodiment for the connector 80 uses an engagement actuator 84. The engagement actuator 84, which may be driven hydraulically or electrically (e.g. by a piston assembly located in a surface of the injection piston 34 or a servo motor, respectively) includes a pin or shutter 86 that is extended or rotated by the actuator 84 to engage within a complementary latch or channel 88 in a surface 90 of the plunger 38. The rear section of the plunger may therefore be shaped to accommodate this channel (while maintaining structural strength).

The operation of the injection unit of FIG. 2 can best be appreciated with reference to FIG. 5 which shows a succession of phases (FIG. 5a to FIG. 5f) of a typical injection cycle and a related connection state (either connected or disconnected) between the plunger 38 and the injection piston 34.

In FIG. 5a ("injection"), a shot of material (or "melt") 100 has already been accumulated in the shooting pot reservoir 28, i.e. within the barrel and in front of the plunger 38. The plunger 38 and injection piston 34 are simply abutting one another and, for reasons of energy efficiency, are preferably not locked together by the connector 80 (e.g. through the use of the electromagnet 82). The two-way valve 26 supports a fluid connection between the shooting pot reservoir 28 and the distributor 20 in the mold with the extruder therefore isolated (from a fluid flow/channel perspective). Actuation of the hydraulic drive 36 (or the like) forces the injection piston 34 and therefore the plunger 38 forward to inject melt into the hot half 14 of the mold, typically via a distributor 20.

In FIG. 5b ("hold"), the two-way valve 26 continues to prevent extruded material in the transfer channel 30 from being routed from the extruder 32 to the shooting pot reservoir 28. The plunger 38 and injection piston 34 are both pushed forward to hold and pack the molten material into a cavity in the mold, as will be readily understood. Again, there is no present need for a fixed coupling between the plunger 38 and the injection piston (a permitted by the connector 80), although there is no significant processing reason for not establishing such a connection at this time.

In FIG. 5c ("decompression"), a small decompression stroke is undertaken; this involves selectively coupling the plunger 38 to the injection piston 34 to permit pull back of the plunger 38. Coupling of the plunger 38 is achieved by activation of the connector 80, e.g. the electromagnet 82. The decompression stroke is preferably merely sufficient to balance approximately the pressure differential in the distributor and/or to prevent drooling of melt from the sprue 22 or distributor 20 (and generally with the system as a whole). The length of active pull-back can therefore be determined empirically since it is system/part dependent, but the length of the pull-back should preferably also include a small safety factor. Within the system of FIG. 2, the position at which the pull-back stops may be determined by a position sensor (or trigger) 101 that communicates a control signal 102 to the controller 60. The controller is then able to pause the pull-back by temporarily switching off the hydraulic drive 36.

In FIG. 5d ("dwell time"), it is preferably that the physical connection (achieved by connector 80) between the plunger 38 and the injection piston 34 is maintained; this avoids the plunger 38 being pulled towards the mold by any residual vacuum within the flow path. During this dwell time, the two-way valve 26 continues to prevent extruded material in the transfer channel 30 from being routed from the extruder 32 to the shooting pot reservoir 28.

In FIG. 5e ("transfer of melt"), the injection piston 34 is disconnected from the plunger 34 and pulled backwards (under the control of the machine controller 60) to just short of its shot-size position. Typically, this "short location", δ, is somewhere between about 3 mm to 10 mm short of the total possible axial displacement for the required shot of melt 100. The hydraulic drive 36 to the injection piston 34 can now be switched off and the injection piston 34 left at this "short location". A determination of whether the injection piston 34 has reached the "short location" can be determined by any conventional trigger, such as a position sensor 105 located (for example) on a rail bed. In response to the sensed location of the injection piston 34, the hydraulic drive 36 can again be shut down by the machine controller 60.

At the approximate point when dwell time is considered sufficiently complete (i.e. when melt accumulation can begin again), the two-way valve 26 is operated to connect the transfer channel 30 to the shooting pot reservoir 28 to permit melt to be accumulated for the next shot. The flow path to the mold is therefore closed by the two-way valve 26. As melt begins and then continues to accumulate in the shooting pot reservoir 28, the melt front forces the plunger 38 backwards towards the injection piston by virtue of exerted melt pressure only. Only the mass and frictional forces associated with the plunger 38 need to be overcome by the melt (since the injection piston has already been moved away), with these factors influencing the total amount of work now performed by the melt. With less work being performed by the plastic, the amount of induced shear within the plastic is generally reduced.

The pull-back speed for the injection piston is therefore very much greater than the slow backwards progression (caused by push-back) of the plunger under melt pressure alone (which is the lowest possible force). Timing of the pull-back of the injection piston therefore at least initially differs from the push-back of the plunger 38.

In FIG. 5f ("attain shot size"), the volume of the shooting pot reservoir 28 has been expanded to an extent that the plunger now begins to abut against the end of the injection piston. The melt now pushes back both the plunger 38 and the abutting injection piston 34 such that a packing function within the shooting pot is performed. This packing continues until shot size is reached, typically determined by a further position sensor 107, whereafter the process begins again with FIG. 5a (where the two-way valve 26 again switches to permit injection of melt and isolation of the extruder).

With less work now performed by the melt during its entire accumulation phase (which now includes a distinct decompression phase), improved part quality is achieved by implementation of the present invention. More specifically, fibre length is not adversely affected to any appreciable extent by additional shear. And drool or even the likelihood of its occurrence is at least substantially (if not totally) eliminated by the assisted decompression stroke.

Figure 6:
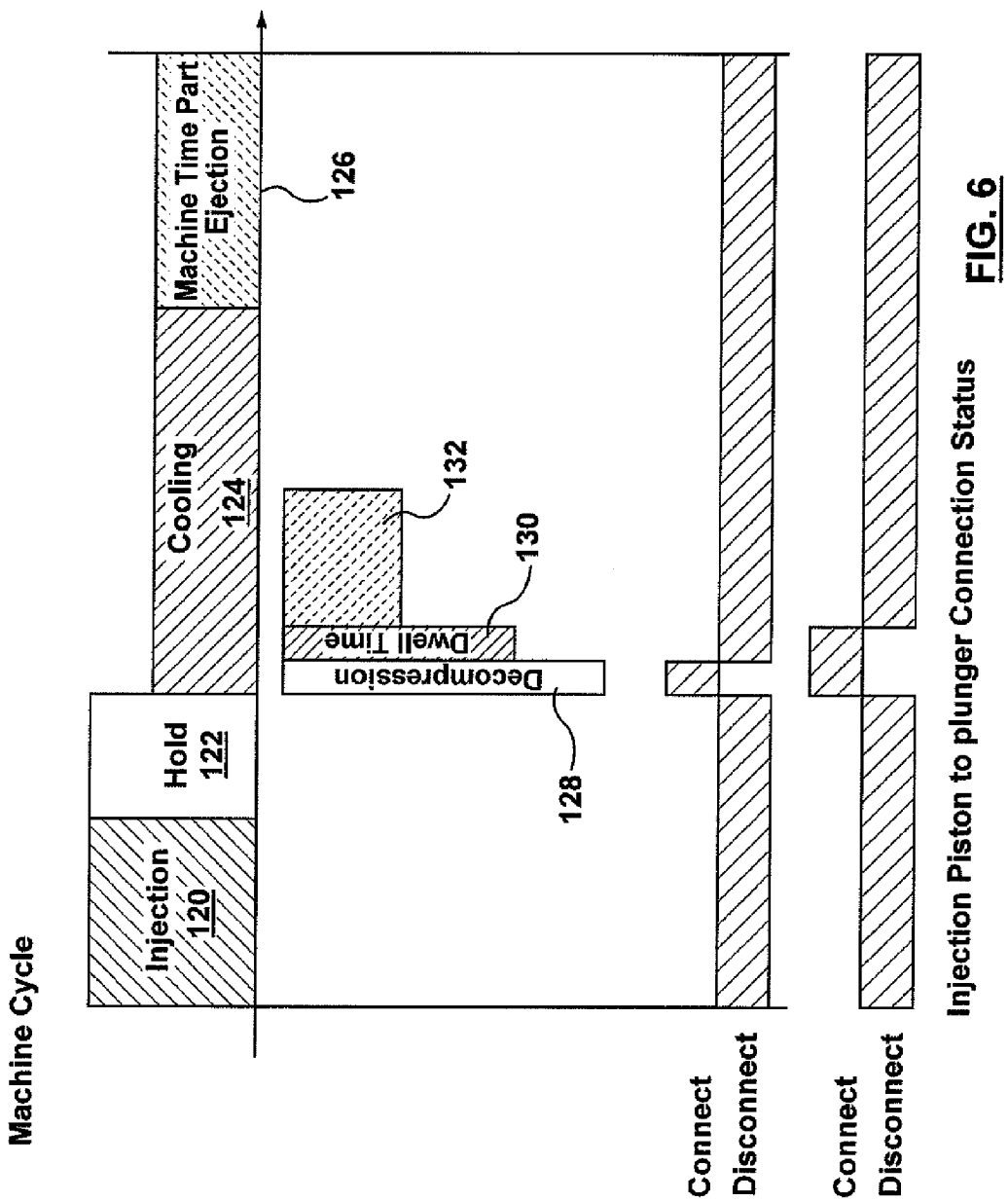
FIG. 6 is a timing diagram of an injection cycle that reflects the process of FIG. 5.

Finally, referring to FIG. 6, the process employed by the present invention is shown scheduled relative to the phases of a typical injection cycle consisting of: injection 120; hold 122; cooling 124; and machine time/part ejection 126. As will be understood, cooling includes sub-phases, namely: mold decompression 128; dwell time 130; and the timing period 132 required to change the orientation (and fluid channel connections) in the two-way valve 26 located at the end of both the transfer channel and the barrel 41. According to the preferred embodiments of the present invention, the plunger and injection piston are physically coupled (in a fixed sense) to each other during decompression and (preferably also) hold, but during the remaining phases of the injection cycle these units are independently of each other.

It will, of course, be appreciated that the above description (and reference to an in-line compounding environment) has been given by way of example only and that modifications and variations will be readily apparent to the skilled exponent without departing from the scope of the appended claims. For example, the present invention is generally applicable to any injection molding system that uses a two-stage unit and which requires decompression of runner systems. Indeed, the present invention of plunger-assisted, active decompression can find application with all molds with open nozzles and a decompression stroke (e.g. closure systems and automotive component molding systems).

The present invention assists with processing in hot runner and cold runner systems or systems that are in fact runnerless, nor is the present invention limited to the particular type of screw used in the extruder, e.g. single screw, TSE, co-rotating or counter-rotating variants. In fact, the present invention provides a solution to active control of runner decompression that reduces both work stresses induced into plastic melt as it is accumulated in front of a plunger and the possibility of melt drool at the interface between hot and cold regions in the mold.

The invention claimed is:

1. A method of active decompression of an injection molding system having a molding environment containing at least one of a mold and a runner system the injection molding system having a combination of an injection plunger and an injection piston arranged to effect injection of melt into the molding environment, the method comprising:

temporarily coupling the injection plunger to the injection piston to effect limited decompression of the molding environment, the temporary coupling permitting the injection plunger and injection piston to be pulled back together at a time after the injection of melt; and at a time after the injection plunger and injection piston have been pulled back together, physically separating the injection piston from the injection plunger to permit the injection piston to be pulled away from the injection plunger in an assisted manner.

2. The method of active decompression according to claim 1, wherein an injection molding cycle includes a decompression time (128) and dwell time (130), the method comprising:

temporary coupling the injection plunger to the injection piston for a duration of time substantially corresponding to a sum of the decompression time (128) and the dwell time (130).

3. The method of active decompression according to claim 1, wherein temporary coupling of the injection plunger to the injection piston occurs during a decompression phase of an injection molding cycle.

4. The method of active decompression according to claim 1, 2 or 3, wherein the draw-back of the injection plunger with the injection piston is paused by actuation of a position sensor.

5. The method of active decompression according to any of claim 1-3, wherein assisted pulling away of the injection piston from the injection plunger ceases when the injection piston reaches a predefined trigger point that itself is insufficient to yield a full shoot size of melt.

6. The method of active decompression according to claim 5, the method further comprising:
   permitting melt to push back the injection plunger to contact the injection piston at the predefined trigger; and
   permitting the melt to push back further the injection plunger and the injection piston to a shot size position.

7. The method of active decompression according to any of claims 1-3, wherein the injection piston is pulled away from the injection plunger in an assisted manner at a time before a shot of melt sufficient for injection purposes has been accumulated.

8. The method of active decompression according to any of claims 1-3, wherein limited decompression is achieved at a point where the pressure differential in the distributor is approximately balanced.

9. The method of active decompression according to any of claims 1 to 3, wherein limited decompression is achieved at a point where drooling of melt is substantially prevented within the molding environment.

10. A method of developing volume in a shooting pot reservoir in an injection cylinder containing a moveable plunger and an injection piston, the method comprising:
   initially connecting together and pulling back the plunger and the injection piston to define a first volume within the shooting pot reservoir;
   disconnecting the plunger from the injection piston and pulling pack the injection piston to a predefined check point; and
   accumulating melt in the first volume and permitting the plunger to be pushed back by action of the melt, the volume of the shooting pot reservoir thereby increasing as the plunger moves towards the injection piston at the predefined check point.

11. The method of developing volume in a shooting pot reservoir according to claim 10, the method further comprising:
   further increasing the volume of the shooting pot reservoir (28) to a shot volume defined beyond the predefined check point, the volume increase caused by melt pushing back the plunger and the injection piston.

12. The method of developing volume in a shooting pot reservoir according to claim 11, wherein only touching abutment exists between the plunger and the injection piston during the step of further increasing the volume to the shot volume.

13. A two-stage injection unit having:
   a shooting pot for accumulating, in use, a shot of melt;
   a plunger axially movable within the shooting pot;
   an injection piston arranged to initiate, in use, ejection of the shot of melt accumulated in front of the plunger and within the shooting pot;
   a drive unit, coupled to the injection piston, for both driving the injection piston forward to force, in use, ejection of melt from the shooting pot and for retracting the injection piston backwards; and
   a coupling permanently attached to one of the plunger and the injection piston, the coupling selectively connectable to the other of the plunger and the injection piston to permit:
   i) the plunger and the injection piston to be connected together temporarily during a portion of the melt accumulation process; and
   ii) the injection piston and the plunger to be retracted together by the drive unit for a first period of time after the ejection of melt from the shooting pot and for the injection piston to be retracted independently of the plunger during a second of period of time that follows the first period of time.

14. The two-stage injection unit according to claim 13, further comprising: a first sensor arranged to generate a first control signal that temporarily suspends retraction of the injection piston at the end of a decompression stroke.

15. The two-stage injection unit according to claim 14, wherein the first control signal causes the coupling to effect disengagement of the plunger from the injection piston.

16. The two-stage injection unit according to claim 15, wherein disengagement of the coupling occurs after a delay.

17. The two-stage injection unit according to any of claims 13 to 16, wherein the coupling is one of:
   i) a mechanical coupling; and
   ii) an electromagnetic coupling.

18. An injection molding machine (10) comprising a two-stage injection unit:
   a shooting pot for accumulating, in use, a shot of melt;
   a plunger axially movable within the shooting pot;
   an injection piston arranged to initiate, in use, ejection of the shot of melt accumulated in front of the plunger and within the shooting pot;
   a drive unit, coupled to the injection piston, for both driving the injection piston forward to force, in use, ejection of melt from the shooting pot and for retracting the injection piston backwards; and
   a coupling permanently attached to one of the plunger and the injection piston, the coupling selectively connectable to the other of the plunger and the injection piston to permit:
   i) the plunger and the injection piston to be connected together temporarily during a portion of the melt accumulation process; and
   ii) the injection piston and the plunger to be retracted together by the drive unit for a first period of time after the ejection of melt from the shooting pot and for the injection piston to be retracted independently of the plunger during a second of period of time that follows the first period of time.

19. The injection molding machine according to claim 18, wherein the injection molding machine is an in-line compounding machine.

* * * * *